United States Patent [19]

Yamamoto et al.

[11] Patent Number: 5,290,207

[45] Date of Patent: Mar. 1, 1994

[54] AUTOMATIC TENSION ADJUSTER FOR FAN BELT

[75] Inventors: Yukio Yamamoto, Oyama; Chukichi Nihei, Yuuki; Katsuya Fujimoto, Shimotsuga, all of Japan

[73] Assignee: Kabushiki Kaisha Komatsu Seisakusho, Tokyo, Japan

[21] Appl. No.: 849,445

[22] PCT Filed: Nov. 14, 1990

[86] PCT No.: PCT/JP90/01477

§ 371 Date: May 19, 1992

§ 102(e) Date: May 19, 1992

[87] PCT Pub. No.: WO91/07611

PCT Pub. Date: May 30, 1991

[30] Foreign Application Priority Data

Nov. 22, 1989 [JP] Japan .................. 1-135761

[51] Int. Cl.⁵ ............................................. F16H 7/12
[52] U.S. Cl. ................................... 474/109; 474/133
[58] Field of Search ................. 474/101, 109, 133, 135

[56] References Cited

U.S. PATENT DOCUMENTS

| | | | |
|---|---|---|---|
| 2,169,510 | 8/1939 | Wool | 474/109 X |
| 4,069,719 | 1/1978 | Cancilla | 474/135 X |
| 4,285,676 | 8/1981 | Kraft | 474/135 |
| 4,713,044 | 12/1987 | Nakamura et al. | 474/135 |
| 4,713,045 | 12/1987 | Kodama et al. | 474/135 |
| 4,768,997 | 9/1988 | Page et al. | 474/84 |

FOREIGN PATENT DOCUMENTS

| | | | |
|---|---|---|---|
| 53954 | 6/1982 | European Pat. Off. | 474/135 |
| 977790 | 4/1951 | France | 474/135 |
| 31-2014 | 3/1956 | Japan . | |
| 47-17775 | 6/1972 | Japan . | |
| 56-81254 | 7/1981 | Japan . | |
| 63-28950 | 2/1988 | Japan . | |

Primary Examiner—Ramon S. Britts
Assistant Examiner—Roger J. Schoeppel
Attorney, Agent, or Firm—Richards, Medlock & Andrews

[57] ABSTRACT

An automatic tension adjuster for a fan belt which automatically adjusts the tension of a fan belt even at the time of sudden decrease in speed of an associated engine so as to prevent slip, so-called "creak" or the like from occurring between the fan belt and a crank pulley. For this purpose, there is provided an adjusting means (30) for automatically adjusting an amount by which a lever (5) swings in a direction opposite to that in which it has pushed a tension pulley (4) against the fan belt (8) when the rotational speed of the crank pulley (1) suddenly lowers. This adjusting means includes the lever (5), a yoke (10), an adjusting bolt (13), a lock nut (14) and a fixing bracket (20).

20 Claims, 2 Drawing Sheets

NORMAL OPERATION &
SUDDEN ACCELERATION

SUDDEN DECELERATION

AUTOMATIC TENSION ADJUSTER FOR FAN BELT

TECHNICAL FIELD

The present invention relates to an automatic tension adjuster for a fan belt which adjusts the tension of a fan belt so as to prevent slip, so-called "creak" or the like from occurring between the fan belt and a crank pulley.

BACKGROUND ART

A conventional device for automatically adjusting the tension of a fan belt (an automatic tensioner) will be described with reference to FIGS. 4 and 5. In the drawings, numeral 101 indicates a crank pulley, which is firmly attached to the tip end of the crankshaft of an engine (not shown). Numeral 102 indicates a fan pulley, which is rotatably attached to the tip end of an shaft firmly attached to a bracket of an engine front cover (not shown), and to an end surface of which a fan 103 is attached. Numeral 104 indicates a tension pulley, which is rotatably attached to the tip end of a lever 105 fitted onto a shaft section 106 firmly attached to the bracket of the engine front cover (not shown) and adapted to make a swing motion. Further, a coil spring 107 is wound around the shaft section 106 of the lever 105, and, by the reaction force of this coil spring, the tension pulley 104 is pushed against a belt 108, thereby imparting tension to the belt 108.

The operation of this device will now be described. During normal operation of the engine, the belt 108 is driven by the crank pulley 101, and, due to the resistance of the fan 103, a belt portion 108a receives a tensile force and tightens, whereas a belt portion 108b slackens. However, the tension pulley 104 moves in the direction of the arrow F due to the action of the coil spring 107 attached to the shaft section 106, and pushes the belt portion 108b to impart tension thereto, so that no slackening occurs. If the engine suddenly accelerates, the acceleration time is long, so that the tension pulley 104 follows the belt portion 108b to impart tension thereto, thus preventing slackening.

At the time of sudden deceleration of the engine, the deceleration time is short, so that the tension pulley 104 cannot follow the belt portion 108b. Further, while the crank pulley 101 on the driving side rapidly decelerates, the fan pulley 102 on the driven side cannot decelerate rapidly due to the inertia of the fan 103, with the result that the fan pulley 102 is turned to the driving side and the crank pulley 101 to the driven side. As a result, the belt portion 108a becomes the slack side, and the belt portion 108b the tight side. Due to the tight belt portion 108b, the tension pulley 104 moves in the reverse direction R, thereby causing the belt portion 108a to further slacken. As a result, the crank pulley 101 and the belt 108 become liable to slip and cause so-called "creak."

The present invention has been made with a view to solving the above problem. It is accordingly an object of the present invention to provide an automatic tension adjuster for a fan belt which adjusts the tension of a fan belt even at the time of sudden decrease in speed of the engine so as to prevent slip, so-called "creak" or the like from occurring between the fan belt and a crank pulley.

DISCLOSURE OF THE INVENTION

In accordance with the present invention, there is provided an adjusting means for automatically adjusting an amount by which a swingable lever rotatably supporting a tension pulley at one end and having a coil spring swings in a direction opposite to that in which it pushes the tension pulley against the fan belt when the rotational speed of the crank pulley suddenly lowers as a result of sudden decrease in speed of the engine. This adjusting means comprises a lever having a pin, a yoke having an elongated hole into which the pin is fitted with some play therebetween, an adjusting bolt threadedly engaged with the other end of this yoke, a lock nut for fastening this bolt onto the yoke, and a fixing bracket through which this adjusting bolt passes. Thus, during normal operation or at the time of sudden acceleration of the engine, the above-mentioned lever swings in such a manner as to push the tension pulley against the fan belt to impart tension to the fan belt, so that no slackening occurs. At the time of sudden deceleration of the engine, on the other hand, the rotational speed of the crank pulley also decelerates suddenly, and the abovementioned lever swings in a direction opposite to that in which it pushes the tension pulley. However, since the amount of swing motion is adjusted by the above-mentioned adjusting means, tension is imparted to the fan belt, so that no slackening occurs. Thus, slip, so-called "creak" and the like are prevented from occurring between the fan belt and the crank pulley.

BEST MODE FOR CARRYING OUT THE INVENTION

Figure 2:
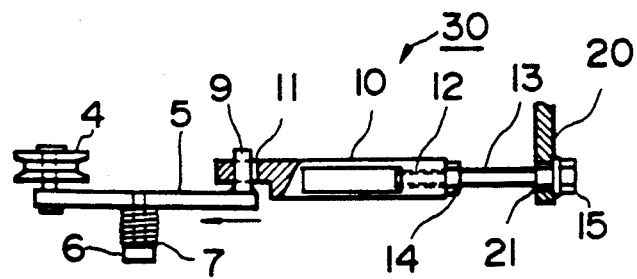
FIG. 2 is a partially cutaway view of an automatic tension adjuster for a fan belt according to the present invention in a stopped state or at the time of sudden deceleration.
Figure 3:
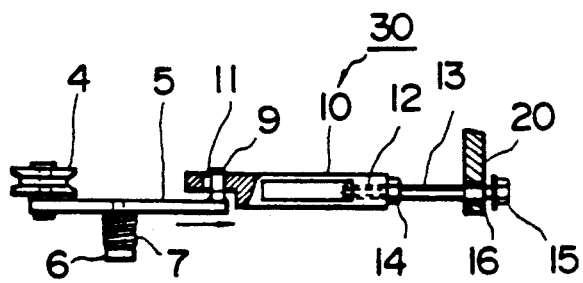
FIG. 3 is a partially cutaway view of an automatic tension adjuster for a fan belt according to the present invention during normal operation or at the time of sudden acceleration.
Figure 4:
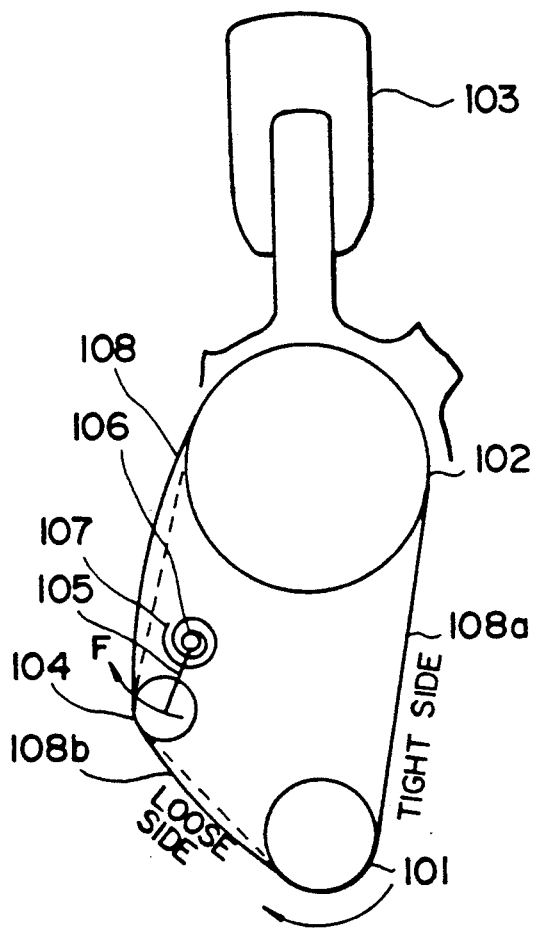
FIG. 4 is a diagram illustrating a pulley, belt, etc. according to a prior-art technique in normal operating condition or at the time of sudden acceleration.
Figure 5:
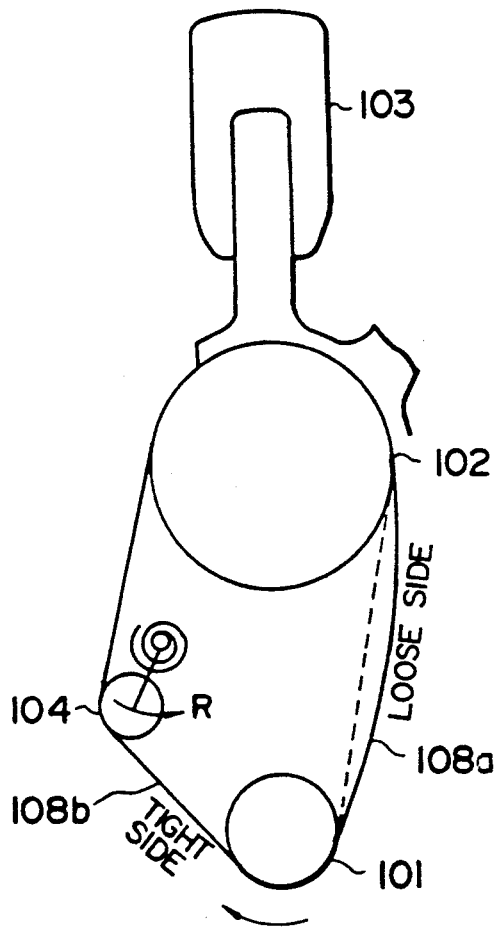
FIG. 5 is a diagram illustrating the pulley, belt, etc. according to the prior-art technique at the time of sudden deceleration.

An embodiment of the present invention will be described in detail with reference to FIGS. 1 to 3.

Figure 1:
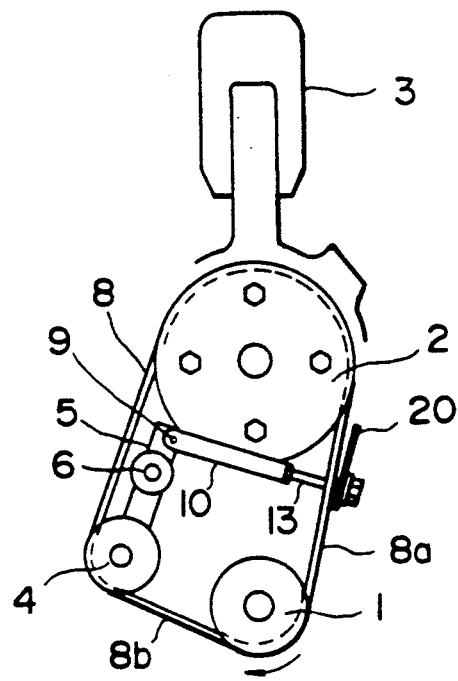
FIG. 1 is a conceptual diagram showing an arrangement of a pulley, belt, yoke, etc. according to the present invention.

In FIG. 1, numeral 1 indicates a crank pulley, which is firmly attached to the tip end of the crankshaft of an engine (not shown) and which serves as a drive source for transmitting the driving force of the engine to a fan. Numeral 2 indicates a fan pulley, which is rotatably mounted on a shaft firmly attached to a bracket of an engine front cover (not shown), and to an end surface of which a fan 3 is attached. Numeral 4 indicates a tension pulley, which is rotatably mounted on the tip end of a lever 5 fitted onto a shaft 6 firmly attached to the engine front cover bracket (not shown). A pin 9 is firmly attached to the other end of the lever 5. As shown in FIGS. 2 and 3, a torsion coil spring 7 is wound around the shaft 6 of the lever 5. Due to this arrangement, the lever 5 is biased in a clockwise direction, as seen in FIG. 1, so that the tension pulley 4 is pushed against the belt 8 to impart tension thereto. Further, firmly attached to the engine front cover (not shown) is a bracket 20 having a hole through which an adjusting bolt 13 passes.

An adjusting means 30 is attached to the pin 9 of the above-mentioned lever 5. The adjusting means 30 comprises a yoke 10 having at one end an elongated hole 11 adapted to engage with the pin 9 with some play therebetween and at the other end a threaded section 12, an adjusting bolt 13 threadedly engaged with the threaded section 12 of this yoke, a lock nut 14 for fastening the adjusting bolt 13 to the yoke 10, and the bracket 20 through which the adjusting bolt 13 passes. When the engine is in the stopped state, adjustment is performed by using the adjusting bolt 13 threadedly engaged with the threaded section 12 in such a manner that the pin 9 of the lever 5 is in contact with the left-hand end of the elongated hole 11 of the yoke 10, with the belt 8 properly tightened by the tension pulley 4. At this time, a head section 15 of the adjusting bolt 13 is in contact with the bracket 20. Subsequently, the lock nut 14 is fastened to integrally connect the yoke 10 and the adjusting bolt 13 (see FIG. 2).

Next, the operation of the present device will be described. In the normal operating condition of the engine or at the time of sudden acceleration thereof, the belt 8 is driven by the crank pulley 1, and, due to the resistance of the fan 3, a belt portion 8a receives a tensile force to tighten, whereas a belt portion 8b slackens. However, due to the action of the coil spring 7 attached to the shaft 6 of the lever 5 tending to rotate the lever 5 in the clockwise direction (FIG. 1), the belt portion 8b is tightened by the tension pulley 4. Further, if, at the time of sudden acceleration, the belt 8 suddenly expands, the pin 9 of the lever 5 moves to the right-hand end of the elongated hole 11 of the yoke 10, or further pushes the right-hand end of the elongated hole 11 to form a gap 16 between the head section 15 of the adjusting bolt 13 and the bracket 20, with the result that lever 5 is allowed to move, and the action of the tension pulley 4 to tighten the belt 8 is not hindered by the adjusting means 30 (see FIG. 3).

At the time of sudden decrease in speed of the engine, on the other hand, the deceleration time is short, and, although the crank pulley 1 on the driving side suddenly decelerates, the fan pulley 2 on the driven side cannot rapidly decelerate due to the inertia of the fan 3. As a result, the fan pulley 2 is turned to the driving side, and the crank pulley 1 to the driven side, with the belt portion 8a slackening and the belt portion 8b tightening. The tension pulley 4 is pulled to the side of the belt portion 8b, and tends to move in a direction to slacken the entire belt 8, i.e., the lever 5 tends to rotate counterclockwise as viewed in FIG. 1 (the direction opposite to that in which it moves at the time of sudden acceleration). However, since the pin 9 of the lever 5 is in contact with the left-hand end of the yoke 10, and the head section 15 of the adjusting bolt 13 integrally connected to the yoke 10 is restricted by the bracket 20, the lever 5 cannot move. Accordingly, the tension pulley 4 continues to tighten the belt 8, and causes no slip. Further, no creak due to slip occurs (see FIG. 2).

As described above, the tension pulley 4 is not restricted in its movement during normal operation and at the time of sudden acceleration, and follows the belt 8 to prevent slackening. At the time of sudden deceleration, on the other hand, the movement of the tension pulley 4 is restricted by the yoke 10 and the adjusting bolt 13, so that the belt 8 is prevented from slackening and the generation of slip, so-called "creak" and the like can be prevented.

INDUSTRIAL APPLICABILITY

In accordance with the present invention, there is provided a useful automatic tension adjuster for a fan belt which adjusts the tension of a fan belt so as to prevent slip, so-called "creak" or the like from occurring between the fan belt and a crank pulley.

What is claimed is:

1. A fan belt apparatus having an automatic tension adjuster for automatically adjusting the tension of a fan belt during changes in the speed of said fan belt; said fan belt apparatus having a fan belt stretched between a crank pulley, a fan pulley and a tension pulley, and a swingable lever which has a coil spring and which rotatably supports said tension pulley at one end, said coil spring biasing said lever during operation of said fan belt to swing in a first direction to push said tension pulley against said fan belt, wherein said automatic tension adjuster is equipped with an adjusting means which automatically limits the extent to which said lever is permitted to swing, in the direction opposite to that direction in which said lever is biased by said coil spring to push said tension pulley, when the rotational speed of said crank pulley suddenly lowers.

2. An automatic tension adjuster according to claim 1, wherein said adjusting means comprises: said lever having a pin firmly attached to the other end thereof opposite to said tension pulley; a yoke having an elongated hole adapter to be engaged with said pin with some play therebetween and a threaded section at the other end portion thereof opposite to said elongated hole; an adjusting bolt threadedly engaged with the threaded section of said yoke; a lock nut for fastening said adjusting bolt to said yoke; and a fixing bracket through which said adjusting bolt passes.

3. An automatic tension adjuster for adjusting the tension during operation of a belt which passes around a crank pulley, a tension element, and a driven pulley; said automatic tension adjuster comprising:
 a shaft, a lever pivotably mounted on said shaft, said lever having a first end portion and a second end portion, said tension element being mounted on said first end portion of said lever, a coil spring biasing said lever for rotation in a first direction about said shaft to push said tension element against said belt to impart tension to said belt;
 a bracket; and
 a mechanical linkage extending between said bracket and said second end portion of said lever for permitting, during the operation of said crank pulley, motion of said second end portion of said lever in said first direction about said shaft, without hinderance from the mechanical linkage, to thereby impart tension to said belt during normal operation of said crank pulley and during sudden acceleration of said crank pulley, said mechanical linkage limiting the rotation of said second end portion of said lever about said shaft in the direction opposite to said first direction at the time of a sudden decrease in speed of said crank pulley, to thereby automatically adjust the tension of said belt.

4. An automatic tension adjuster in accordance with claim 3, wherein said mechanical linkage provides for adjustment of the amount by which said lever can rotate about said shaft in a direction opposite to that caused by the bias of said spring.

5. An automatic tension adjuster in accordance with claim 4, wherein the length of said mechanical linkage is adjustable.

6. An automatic tension adjuster in accordance with claim 4, wherein said mechanical linkage comprises a yoke having a first end portion and second end portion, one of said first end portion of said yoke and said second end portion of said lever having an elongated hole, the other of said first end portion of said yoke and said second end portion of said lever having a pin mounted thereon and slidably positioned within said elongated hole so as to limit the movement of said lever in a direction opposite to that caused by the bias of said spring.

7. An automatic tension adjuster in accordance with claim 6, wherein said tension element comprises a tension pulley rotatably mounted on said first end portion of said lever.

8. An automatic tension adjuster in accordance with claim 7, wherein the length of said mechanical linkage is adjustable.

9. An automatic tension adjuster in accordance with claim 8, wherein said second end portion of said yoke is adjustably mounted to said bracket by an adjusting member which passes freely through an opening in said bracket, said adjusting member having a first end portion and a second end portion, said first end portion of said adjusting member being adjustably secured to said second end portion of said yoke, and a head on said second end portion of said adjusting member positioned on the side of said bracket opposite said first end portion of said adjusting member to thereby permit limited movement of said adjusting member with respect to said bracket.

10. An automatic tension adjuster in accordance with claim 9, wherein said first end portion of said adjusting member is threadedly engaged with said second end portion of said yoke.

11. An automatic tension adjuster in accordance with claim 10, wherein said adjusting member comprises a bolt having a bolt head at one end and a threaded portion at the other end.

12. An automatic tension adjuster in accordance with claim 11, wherein said elongated hole is located in said first end portion of said yoke, and said pin is mounted on said second end portion of said lever.

13. An automatic tension adjuster in accordance with claim 12, wherein said lever is mounted on said shaft with said first end portion of said lever and said second end portion of said lever being on opposite sides of said shaft.

14. An automatic tension adjuster in accordance with claim 13, wherein said spring is mounted about said shaft.

15. An automatic tension adjuster in accordance with claim 6, wherein said second end portion of said yoke is adjustably mounted to said bracket by an adjusting member which passes freely through an opening in said bracket, said adjusting member having a first end portion and a second end portion, said first end portion of said adjusting member being adjustably secured to said second end portion of said yoke, and a head on said second end portion of said adjusting member positioned on the side of said bracket opposite said first end portion of said adjusting member to thereby permit limited movement of said adjusting member with respect to said bracket.

16. An automatic tension adjuster in accordance with claim 16, wherein said first end portion of said adjusting member is threadedly engaged with said second end portion of said yoke.

17. An automatic tension adjuster in accordance with claim 15, wherein said adjusting member comprises a bolt having a bolt head at one end and a threaded portion at the other end.

18. An automatic tension adjuster in accordance with claim 6, wherein said elongated hole is located in said first end portion of said yoke, and said pin is mounted on said second end portion of said lever.

19. An automatic tension adjuster in accordance with claim 6, wherein said lever is mounted on said shaft with said first end portion of said lever and said second end portion of said lever being on opposite sides of said shaft.

20. An automatic tension adjuster in accordance with claim 6, wherein said spring is mounted about said shaft.

* * * * *

UNITED STATES PATENT AND TRADEMARK OFFICE
CERTIFICATE OF CORRECTION

PATENT NO. : 5,290,207
DATED : March 1, 1994
INVENTOR(S) : Yukio YAMAMOTO et al

It is certified that error appears in the above-indentified patent and that said Letters Patent is hereby corrected as shown below:

Column 4, line 31 (line 5 of patent claim 2), delete "adapter" and insert --adapted--.

Column 5, line 6 (line 3 of patent claim 6), after "and" insert --a--.

Column 6, line 25 (line 2 of patent claim 16), delete "claim 16" and insert --claim 15--.

Signed and Sealed this

Twenty-eighth Day of June, 1994

Attest:

BRUCE LEHMAN

*Attesting Officer*     Commissioner of Patents and Trademarks